United States Patent [19]

DiSanto et al.

[11] Patent Number: 4,732,830

[45] Date of Patent: Mar. 22, 1988

[54] ELECTROPHORETIC DISPLAY PANELS AND ASSOCIATED METHODS

[75] Inventors: Frank J. DiSanto, North Hills; Denis A. Krusos, Lloyd Harbor, both of N.Y.

[73] Assignee: Copytele, Inc., Huntington Station, N.Y.

[21] Appl. No.: 882,271

[22] Filed: Jul. 7, 1986

Related U.S. Application Data

[62] Division of Ser. No. 670,571, Nov. 13, 1984, Pat. No. 4,655,897.

[51] Int. Cl.⁴ .................................................. G02F 1/03
[52] U.S. Cl. ...................................... 430/20; 430/312; 430/314; 430/316; 430/318; 430/329; 430/394; 430/319; 350/333; 350/344; 204/299 R
[58] Field of Search ................. 430/20, 312, 314, 319, 430/320, 316, 317, 318, 394, 329; 350/344, 336, 333, 339 R, 340; 428/1; 204/299 R

[56] References Cited

U.S. PATENT DOCUMENTS

| | | | |
|---|---|---|---|
| 4,068,927 | 1/1978 | White | 350/160 R |
| 4,203,106 | 5/1980 | Dalisa et al. | 340/787 |
| 4,332,075 | 6/1982 | Ota et al. | 29/571 |
| 4,370,194 | 1/1983 | Shaver et al. | 156/643 |

FOREIGN PATENT DOCUMENTS 60-51819 3/1985 Japan .................................. 350/344

Primary Examiner—John E. Kittle
Assistant Examiner—José G. Dees
Attorney, Agent, or Firm—Arthur L. Plevy

[57] ABSTRACT

There is disclosed an electrophorectic display apparatus which includes a planar transparent member having disposed on a surface a plurality of vertical conductive lines to form a grid of lines in the Y direction. On top of the grid of vertical lines there is disposed a plurality of horizontal lines which are positioned above the vertical lines and insulated therefrom by a thin insulating layer at each of the intersection points. Spaced above the horizontal and vertical line pattern is a conductive plate. The spacing between the conductive plate and the X and Y line patterns is filled with an electrophoretic dispersion containing chargeable dye articles. When a voltage is impressed between the X and Y lines, dye pigment particles which are located in wells or depressions between the X and Y pattern are caused to migrate towards the conductive plate and are deposited upon the conductive layer in accordance with the bias applied to the X and Y line conductors. There is described an electrophoretic dispersion suitable for operation with the display as well as techniques for fabricating the display. In this manner the displays can be fabricated to contain large effective display surfaces while being relatively thin and which are capable of high resolution at relatively low power.

4 Claims, 9 Drawing Figures

ELECTROPHORETIC DISPLAY PANELS AND ASSOCIATED METHODS

This is a division of application Ser. No. 670,571 filed Nov. 13, 1984 now U.S. Pat. No. 4,655,897.

BACKGROUND OF THE INVENTION

This invention relates to electroptical display devices in general and more particularly to a display panel employing electrophoretic dispersions for producing graphic data.

The electrophoretic effect is well known, and the prior art is replete with a number of patents and articles which described the effect. It is sufficient to state that researchers have been working with the electrophoretic effect for many years. Essentially, the electrophoretic effect operates on the principle that certain particles will become electrically charged and because of being electrically charged, these particles can migrate from a like charged surface to an opposite charged surface. Hence particles which become positively charged will migrate towards negative surface or terminal or vice versa.

Essentially, many of the prior art references describe various particle materials which exhibit the electrophoretic effect. The effect is associated with a working fluid which includes a dispersion of electrophoretic particles. These particles may be fabricated from an opaque dielectric material such as Titania which particles are suspended in a colored non-conducting suspension medium. The particles are distributed uniformly throughout the suspension medium, and for example Titanis particles may be white with the suspension medium being black. When the composite material is subjected to an electric field, the particles are caused to move electrophoretically in the direction of either the cathode or the anode. These particles are deposited upon the respective structure to cause that structure to assume the color of the particle which then would be white. Hence as one can see, by selectively moving the particles, one can produce images based on the migration and orientation of the particles with respect to a charged surface. As indicated, the effect is well known.

For suitable examples of such devices using the electrophoretic effect, reference is made to U.S. Pat. No. 4,093,534 which issued on June 6, 1978 and entitled Working Fluids for Electrophoretic Image Display Devices, by C. F. Carter et al. This patent provides a working fluid which includes a dispersion of finely divided particles of an opaque dielectric material suspended in a suspension medium. The particles are transportable within the suspension medium under the influence of an electric field. The patent describes various structures which produce a display operating according to the electrophoretic phenonmenon.

Other patents of interest are U.S. Pat. No. 4,298,448 entitled Electrophoretic Display issued on Nov. 3, 1981 to K. Muller et al. This patent describes an electrophoretic display which utilizes electrophoretic particles of various pigments which particles are provided with a coating of organic material which is insulated at the cell operating temperature but which melts at higher temperatures. The coating material contains a charge control agent to cause the particles to possess a uniform surface potential and hence to allow the particles to move in a more controlled manner.

U.S. Pat. No. 4,285,801 entitled Electrophoretic Display Composition issued on Aug. 25, 1981 to A. Chiang described a suspension for electrophoretic display systems where the particles are coated with a highly fluorinated polymeric material which acts as a dispersant. Essentially, as indicated in such systems, the particles are chosen to optically contrast with the medium. Accordingly, the optical contrast may result from using light reflecting versus light absorbing materials or materials of different colors as above indicated.

Thus in the above example, where white particles are dispersed in a black fluid, the suspension will be grey until application of an electric field. The particles affected by the field will migrate to one surface or electrode giving it a white appearance with the corresponding areas of the opposite electrode or surface appearing black. As one can ascertain from the above noted prior art and various other patents and articles which also have been referenced in the prior art, the electrophoretic display or electrophoretic image displays (EPID) are well known and have been investigated by many researchers. In spite of such investigations there has not been available a display utilizing the electrophoretic effect which has been commercially successful.

An electrophoretic display has many advantages in that the materials are relatively inexpensive, while the image formed is non-eraseable even when power is removed. When the electrophoretic particles or dye particles are caused to move, as indicated above, to form an image, the image will not erase and remains on the display even upon removing of power. Hence the image must be erased in the same manner as it was created and that is by application to the device of an electric field of opposite polarity 5.

Thus such displays have a built-in memory in the sense that the images created by the displays do not have to be refreshed such as those images produced by CRT's and other types of display devices. The problems faced by the prior art are many which involve seeking a reliable electrophoretic medium as well as for providing a large size display which is economical to fabricate and which is reliable in operation.

It is, therefore, an object of the present invention to provide am improved electrophoretic display which operates in conjunction with an improved electrophoretic medium. It is a further object to provide an electrophoretic display which is capable of reliable operation associated with a rugged strucure which is economical to fabricate.

BRIEF DESCRIPTION OF THE PREFERRED EMBODIMENT

An electrophoretic display apparatus comprising a planr transparent member having a plurality of vertical conductive lines deposited on a surface thereof, each of a given width and length and separated one from the other to form a grid of lines in the Y direction with each of said lines having a predetermined area of intersection manifested by an insulative material secured to said lines, a plurality of horizontal conductive lines positioned over said area of intersection and directed transverse to said vertical lines to form a grid of lines in the X direction, each horizontal line separated from intersected vertical lines by said insulative material, with well depressions formed adjacent said intersections, a top transparent planar member positioned above said transparent planar member and spaced therefrom, with the spacing between said members filled with an electrophoretic dispersion, means for biasing said X grid with respect to said Y grid to cause electrophoretic particles in said dispersion to migrate from said well areas to said top planar member according to said bias as effectively applied to an intersection between said X and Y grid structure.

DETAILED DESCRIPTION OF THE FIGURES

Figure 1:
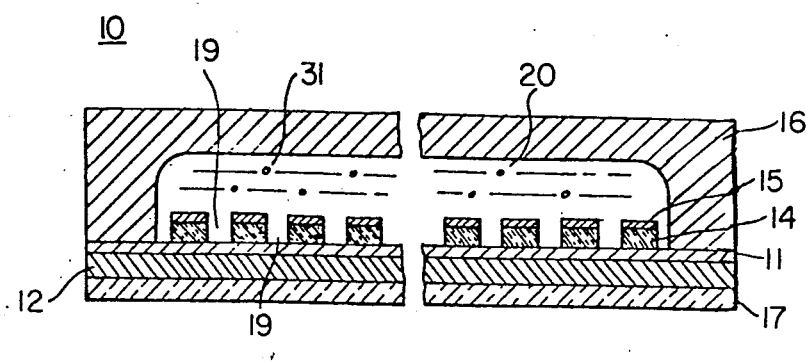
FIG. 1 is a cross sectional view of an electrophoretic display panel according to this invention.

Referring to FIG. 1, there is shown an electrophoretic display device 10 according to this invention.

As will be explained, the electrophoretic display consists of a plurality of cathode lines 11 which lines are arranged in the horizontal or vertical direction, but for purposes of explanation, it is assumed that the cathode lines are arranged in the horizontal direction. The cathode lines, as will be explained, are essentially formed in a horizontal grid pattern where the pattern contains a plurality of spaced lines each one of a given width and spaced from the other to form a horizontal grid array of conductive lines.

As seen in FIG. 1, a plate of glass 17 is coated with an extremely thin layer of indium-tin-oxide (ITO). There are many suppliers who will furnish glass sheets coated with ITO. The layer of ITO, as indicated, is relatively thin being approximately 300 Angstroms in thickness. This layer of ITO, based on its thickness, is relatively transparent. As will be explained, the horizontal cathode line pattern is etched on the surface of the ITO layer 12 to form the horizontal grid pattern. Etching of the ITO layer 12 is performed using conventional etchants as used the integrated circuit art. Disposed upon the cathode line pattern 11 is a series of insulator members 14. The insulator members 14, as will be explained, are formed by a photoresist such as a phenolic resin impregnated with photoactive material which layer is deposited over the cathode line structure. The photoresist layer is treated to selectively remove photoresist where a plurality of vertical lines designated as a grid pattern and arranged in the Y direction are deposited upon the insulator members 14 to form a plurality of grid lines perpendicular to the cathode horizontal line pattern. Each grid line 15, as indicated, is positioned above associated cathode lines and insulated therefrom at the area of intersection by the photoresist layer 14. An anode structure 16 which may be formed of ITO is then secured to the structure to form an internal hollow 20 which hollow will accommodate an electrophoretic dispersion 31. The entire unit is rectangular in shape, as will be explained, although other geometrical configurations can be employed as well and, essentially, creates a self-contained electrophoretic display. The display is capable of being energized by applying a bias to a cathode line and a grid line to cause electrophoretic particles to migrate from the grid cathode structure to the anode or plate structure 16.

As seen in FIG. 1, the spaces as 19 between each grid and cathode line form a plurality of depressions or wells which as indicated are designated by reference numeral 19. These wells accommodate the electrophoretic dispersion and when a bias potential is applied between the grid and cathode, the electrophoretic particles contained in the dispersion migrate from the grid cathode structure towards the anode where they are deposited and remain upon the anode to thus create an electrophoretic image on both the cathode and anode.9

Due to the fact that the grid lines are spaced from the cathode lines by means of the insulating layer 14, the spacing between the grid and cathode, as will be explained, is on the order of magnitude of 6 microns. The anode is spaced from the cathode and grid structure so that the distance is between 2 to 3 times the distance between the grid to cathode spacing, and hence this distance is from 12 to 18 microns. These dimensions are given by way of example only but are given to indicate the small dimensions associated with the structure 10.

As shown in FIG. 1, each grid line is therefore positioned on a pedestal 14 which consists of the photoresist such as a phenolic resin impregnated with photoactive material which is part of the fabrication process. On top of the photoresist pedestal 14 is the thin layer of nickel 15 which constitutes the grid or structure. While nickel is employed as the conductive grid line, other suitable conductive materials can be employed.

Figure 2:
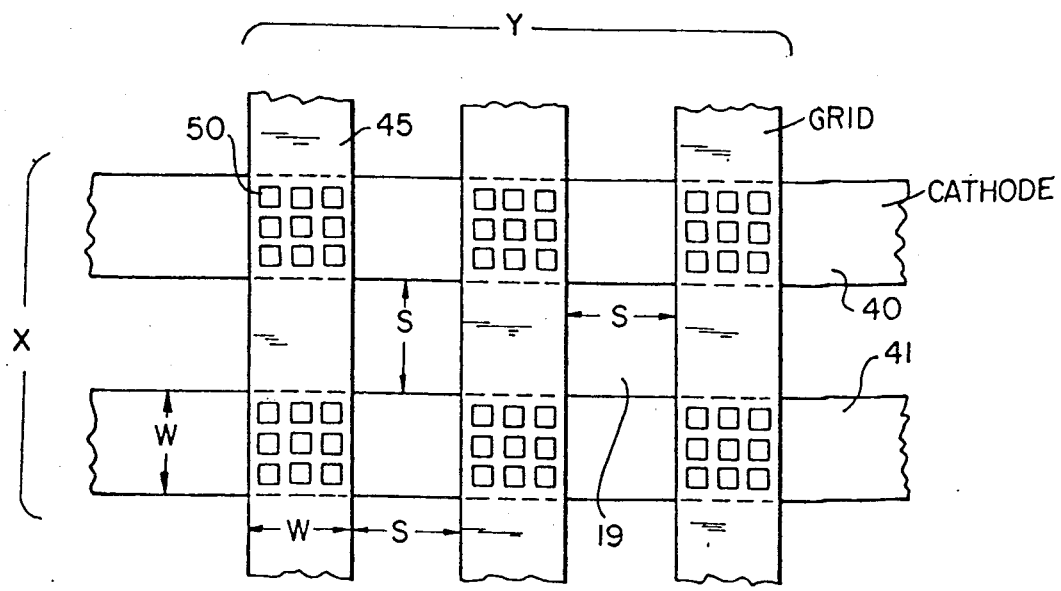
FIG. 2 is a top planar view of a grid and cathode line pattern according to this invention.
Figure 3:
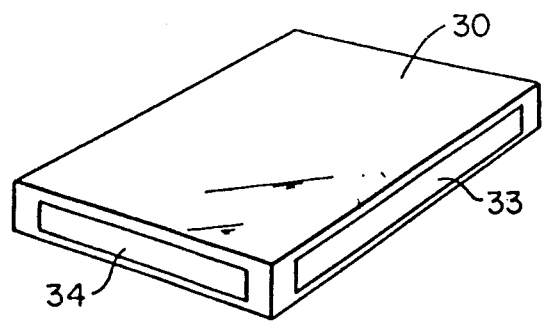
FIG. 3 is a perspective plan view of a completed display panel.

Secured to the wafer 13 is an anode structure 16 which consists of a plate of ITO coated glass. Thus as seen from FIG. 1, the structure consists of a bottom cathode layer 11 which layer is positioned on the glass layer 17. The cathode is associated with the grid structure 15 and the anode structure 16. As indicated, the assembly shown is in the cross section, but a typical assembly as depicted in FIG. 3 constitutes an enclosed flat package having a first transparent major surface which for example constitutes the anode surface 30. The grid and cathode structures are arranged in an XY line pattern wherein the grid lines as shown in FIG. 2 are arranged in the vertical plane with the cathode lines arranged in the horizontal plane for purposes of explanation. Essentially, as shown in FIG. 1, the structure has an internal hollow cavity 20 between the anode grid which is completely enclosed and which cavity contains the electrophoretic suspension 31. Thus as can be seen from FIG. 3, the unit forms a liquid and gas tight enclosure where conductor leads can be brought out to external connectors as 33 and 34 for interfacing to the grid and cathode line structures.

Referring to FIG. 2, there is shown an enlarged view of a typical XY line pattern which consists of the grid and cathode structure for the device of FIG. 1. Essentially, the cathode lines as 40 and 41 may constitute 200 lines per inch wherein a typical display may be fabricated according to the methods of this invention having dimensions of $8\frac{1}{2} \times 11$ inches with 2,200 horizontal rows consisting of 2,200 cathode lines and 1,700 vertical columns consisting of 1,700 grid lines or vice versa. Thus as shown in FIG. 3, the rectangular flat assembly may be $8\frac{1}{2}$ inches wide by 11 inches long to conform to the typical size of an ordinary sheet of paper. It is, of course, understood that the concepts to be described can accommodate larger or smaller configurations. In this particular manner using 200 lines or pixels per inch, one can obtain extremely fine resolution and hence create high resolution display capabilities which exceed the resolution of present commercially available devices.

To give a typical understanding of the dimensions involved, the width W of a grid and cathode line is of the order of the magnitude of 0.003 inches, while the spacing between the lines designated by letter S may be of the order of magnitude of 0.0013 inches.

As seen in FIG. 2, the grid lines are oriented in the vertical direction or the Y direction while the cathode lines are oriented in the horizontal direction or X direction to form an XY array. Thus a grid line such as grid line 45 intersects with cathode lines as 40 and 41. At each point of intersection, a series of fine apertures are formed in each grid line. The apertures as 50 are shown to be nine in number for each intersection of a grid line 45 with a cathode line 40 or 41. As indicated above, each grid line as line 45 is positioned above a respective cathode line as 40 and 41 and separated therefrom by the layer of insulating material which forms the pedestal as 14 of FIG. 1. The spacings between the grid lines 50 form a series of wells or depressions for the grid and cathode structure into which depressions the electrophoretic dispersion material 31 is accommodated. While the number of grid apertures as shown in the Figure is nine, it is understood that more or less apertures can be included. The apertures are preferably rectangular in configuration each being approximately 15 microns×15 microns, but it is understood that other geometrical configurations can be used as well, including different arrangements of the aperture array.

The function of the apertures is to generate an increased electric field at each intersection to assure proper control of the charged electrophoretic particles. The apertures as indicated are extremely small and serve to concentrate the electric field generated by applying a biasing to a grid and cathode line and hence assure controlled migration of the dye particles in the electrophoretic dispersion from the grid to cathode structure towards the anode and vice versa.

Figure 4:
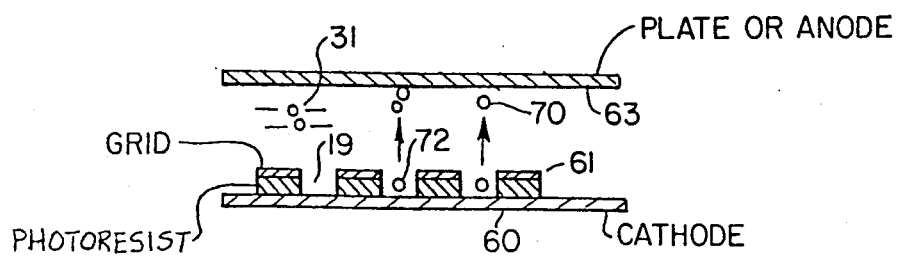
FIG. 4 is a diagrammatic view of a display panel structure for explanation of operation.

Referring to FIG. 4, there is shown a sample schematic indicating operation of the above noted structure. The reference numeral 60 refers to the cathode which as indicated are a series of lines arranged in the horizontal or X direction. Each of these lines can be accessed or biased by means of a separate voltage applied to a cathode line. The associated grid lines are represented by reference numeral 61 with the plate or anode referenced by numeral 63. In order to access a point on the matrix, a potential is applied between the grid and cathode lines. This will access an intersection point in the XY matrix as will be further explained. In any event, the electrophoretic dispersion 31 includes in the space between the anode 63 and cathode grid structure contains a plurality of submicron particles which can be charged according to known techniques and as will be explained. The apertures in the grid array which overlie the area of intersection serve to create a strong electrical field pattern at the selected XY intersection. In this manner electrophoretic particles which are within the well or depression 19 between the grid and cathode structures are accelerated towards the anode. Particles 70 and 72 as indicated by the arrows deposit on the plate and remain there until the charge or bias is reversed. The effect is a "tunneling" effect whereby a strong electric field at the intersection between an X and Y line causes electrophoretic particles in the associated well or depression to migrate towards the anode. As will be explained, if the grid to cathode structure is such that the grid is negative with respect to the plate, electrophoretic particles will be negatively charged by application of operating potentials to the XY matrix. Hence if the plate is positive, the negative dye particles will be attracted toward the plate 63 which will assume the color of the dye particles. An image is formed on both the cathode and the anode. The anode image being the color of the pigment particles and the cathode image being a dark color which is the color of the suspension medium.

As will be explained, the dye particles are suspended in the electrophoretic dispersion and essentially are yellow particles in one embodiment with the dispersion medium having a dark grey color. Thus by viewing the anode surface one will see a yellow character which is outlined by a dark background. As indicated above, the thickness of the display is relatively thin while the total surface area can be quite large, as for example, 8½×11 inches.

Figure 5:
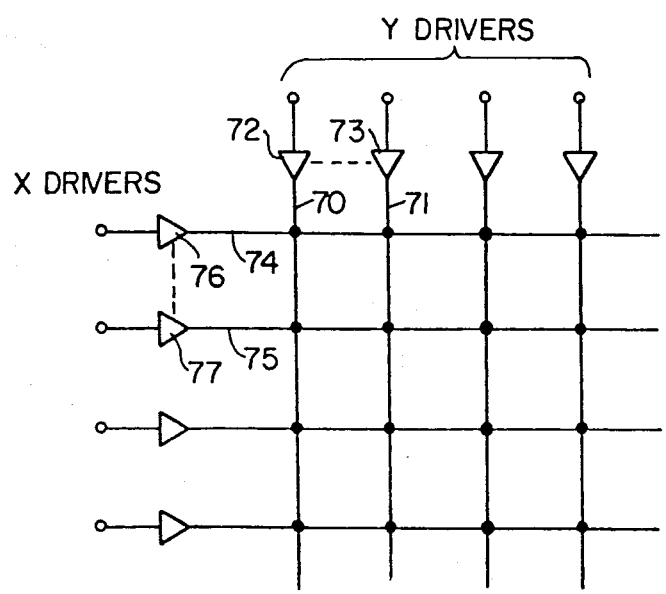
FIG. 5 is a simple electrical schematic indicating electrical control of the display.

Referring to FIG. 5, there is shown a typical circuit configuration. It is, of course, understood that the cathodes and grids, while described previously in the XY plane can be reversed whereby the cathode lines can be arranged in the Y plane with the grid lines in the X plane. As one can see from FIG. 5, each Y line such as 70 and 71 is associated with a driver amplifier as 72 and 73 where each line as 74 and 75 is associated with a grid driver amplfiier as 76 and 77. In this manner by applying proper biasing potentials on the respective amplifiers, one can activate or cause particles to migrate at any intersection between the X and Y matrix formed by the associated grid and cathode lines. Thus based on the X and Y matrix, one can, therefore, produce any alpha numeric numeral, or essentially for a large plurality of intersections, one can reproduce any graphic data such as a television picture or any type of display. The display will be produced with great resolution based on the above noted line patterns and dimensions indicated. The driver amplifiers are fabricated by typical integrated circuit techniques, and may, for example, be MOS devices all of which are well known and many of which are available as conventional integrated circuit chips.

As indicated in The Background of the Invention, a major problem associated with any such electrophoretic display is the fabrication of the display as well as the composition of the suspension medium which contains the electrophoretic particles.

Figure 6A:
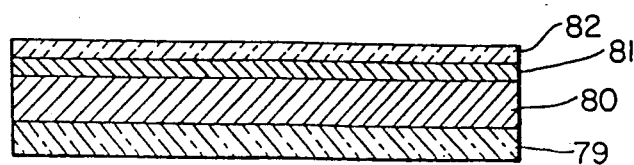
FIGS. 6a to 6d are a series of diagrams depicting one method of fabricating the display shown in FIG. 1.

Referring to FIG. 6a, there is shown a first step in the process of fabricating a display device as 10 of FIG. 1. As indicated, a layer of glass 79 has deposited thereon an extremely thin layer of ITO 80. The layer of ITO 80 is then etched to form a vertical or horizontal line pattern 81 indicative of the cathode structure. After etching the ITO layer to form the horizontal line pattern of FIG. 2 which represents the cathode pattern, a thin layer of photoresist 82 is then deposited on top of the cathode structure.

The thin layer of photoresist is a phenolic resin impregnated with photoactive material which essentially is an insulator.

Figure 6B:
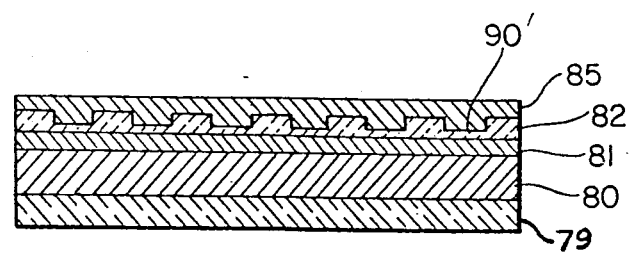

Referring to FIG. 6B, the photoresist layer 82 is then masked and treated by means of conventional photolithographic techniques to form a series of depressions 90 which are indicative of the grid pattern. A layer of nickel 85 is then deposited thereon by an electroless process. This process is well known in the art and suitable equipment is supplied by the Shipley Company of Marlboro, Mass. as well as others.

Figure 6C:
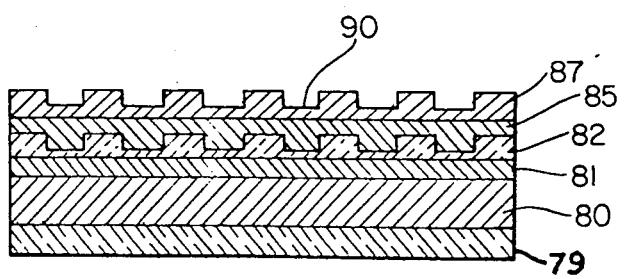
Figure 6D:
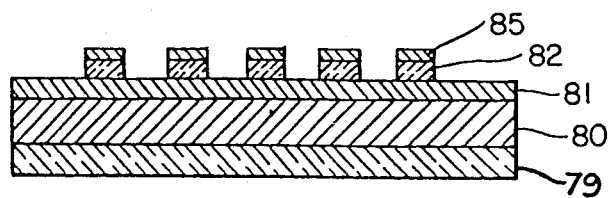

Referring to FIG. 6c, the layer of nickel 85 is then again coated with a photoresist layer 87 which layer also contains the grid line pattern array as 90. Hence as seen in FIG. 6c, the nickel layer 85 indicative of the grid structure is now impressed between layers 82 and 87 both of which are photoresist layers. Hence the excess material which includes the photoresist and the excess nickel can now be selectively removed leaving lines of nickel 85 on pedestals of photoresist 82 as shown in FIG. 6a which is the pattern depicted in FIG. 1. In each stop in the procedure cleaning of the respective surfaces to be operated on is extremely important. Thus, for example, the glass wafer is throughly cleaned prior to the deposition of the ITO layer. This is done to remove all water from the glass as based on operation of the display, water which is a good conductor will create problems in applying potential to the dsiplay and in regard to the general operation of the display. Hence cleaning is accomplished by placing the components in an oven and otherwise thoroughly drying the components and using solvents for removal of impurities for the main prupose of assuring that there is little water contamination.

The electroless deposition of nickel as above indicated is a technique known in the art and suitable components for the electroless deposition of nickel can be obtained from the Shipley Company of Marlboro, Mass., as indicated above. The electroless nickel process allows one to deposit a relatively thin layer of nickel by the use of a solution which contains nickel ions. Another element such as a boron compound is combined with the solution and which serves to donate electrons to assist in depositing nickel without the use of an electric field.

As indicated, the technique is known but has particular advantages in providing the aforementioned structure. Thus the deposition of the grid line pattern is implemented and as indicated employs the above noted techniques.

As one can ascertain, the grid structure is more complicated than the cathode structure in the sense that each grid line contains an aperture array at each intersection as depicted. This aperture configuration is emplaced upon the mask which is transferred to the photoresist in the process step as shown in 6b.

Thus as one can ascertain, the grid structure is completely isolated from the cathode structure. The grid structure also has the photoresist layer which also permits accurate definition of the grid aperture configuration and assures proper alignment of the gird line pattern with respect to the cathode line pattern. The anode structure is now emplaced upon the wafer and secured theeto by a conventional bonding technique to produce the structure shown in FIG. 1. The electrophoretic solution 31 is now inserted into the internal cavity 20. Essentially, the electrophoretic solution 31 consists of submicron particles of a suitable dye element suspended in a fluid vehicle, as will be explained. Each of these particles are encapsulated by means of a charge control and wetting agent which essentially coats the particle to enable the particle to retain an electrical charge. The particles are suspended in suitable vehicle as will be explained whose function is to wet the particles and to allow the particles to be suspended in the vehicle.

As indicated above, there cannot be any appreciable amounts of water associated with the electrophoretic solution. As one understands, water is conductive and would severely interfere with the electrical operation of the panel. Hence the vehicle for the electrophoretic material is basically a surfactant which contains no water. Accordingly, to produce an operational display, a yellow pigment was selected designated as AAOT yellow which is a pigment manufactured by Sun Chemical Company. The charge vehicle employed with this pigment is sold under the trademark CENTROLEX P. CENTROLEX P is a charge control and wetting agent which contains lecithin. To this is added tetrachloroethylene which is the vehicle solvent plus a small amount of an aromatic hydrocarbon to obtain further wettability. A typical solution contained by percentage 4 percent of the AAOT yellow, 0.16 percent of the CENTROLEX P, 80.51 percent of tetrachloroethylene and 15.3 percent of a hyrdrocarbon such as aromatic 150 sold and distributed by the Exxon Corporation.

In regard to the above, the dispersion including the yellow dye particles, when mixed, appears as a dark grey fluid and, when charge is impressed, the yellow dye particles accelerate from cathode to anode and coat the anode giving a yellow graphic image upon a black or dark grey background. This provides for a very efficient display with clear visibility. The dye substance is treated so that the particles are within the submicron range.

Furthermore, the extremely small size of the particles creates a true suspension in that the pigment particles can remain suspended in the solvent indefinitely, and the particles will not sink by means of gravity. The grid cathode structure further helps in preventing the pigment particles from clustering or forming groups of large size due to particle adhesion.

In regard to the above noted structure with the suspension medium, the voltage required on such a display is approximately 1 to 1.2 volts per micron in regard to the width of the grid and cathode lines. Suitable displays have been operated in a write mode whereby 18 volts was impressed upon the anode with six volts upon a grid line with the cathode line being held at ground or reference potentional. In order to erase the display, the voltages were reversed thus making the cathode positive with respect to the plate. Based on the above noted dimensions, a particle which may for example be less than one micron in diameter as 0.00004 inches can be accelerated from the grid cathode well to the anode in about one millisecond.

In regard to the above, the layer of ITO as layer 12 of FIG. 1 which as indicated is deposited upon a layer of glass is approximately 300 angstoms thick. The width of the grid and cathode lines including the spacing therebetween as indicated above is also extremely small with typical widths being from 0.003 to 0.004 inches and with typical spacings between the lines being from 0.001 to 0.002 inches. These dimensions are accommodated utilizing modern integrated circuit techniques as outlined above and are within the state of the art. The dispersion employed as indicated above is one example of a dispersion which will operate satisfactorily in conjunction with the above described structure.

It is, of course, obvious that other dispersions having different dyes such as white dye particles can be formulated as well using Titanium Oxide as the particle substance. A suitable example of a Titanium Oxide is distributed by the Dupont Company under the grade mark R-101. In regard to such a dispersion 10 percent of Titanium Oxide is blended with 0.25 percent of CEN- TROLEX P with 8 percent of copper oleate of 4 percent concentration which is blended with tetrachlorethylene at 81.75 percent concentration. Such dispersions have a typical erase current from one to two microamperes with a typical write current of three microamperes. The above described yellow dispersion exhibits a write and erase current in the vicinity of between 30 to 35 microamperes. Thus as one can ascertain, the display consumes very little power. As indicated above the display has permanent memory due to the fact that once the image is formed, it cannot be erased without a reversal of polarity. Hence once a image is formed on the anode, it will remain there after removal of power.

The resolution of the display is greater than conventional displays and based on modern integrated circuit techniques including the electroless deposition of nickel greater reduction can be achieved. It is anticipated that the resolution can be as high as 40,000 dots per square inch. The yellow pigments employed are generally referred to as diacrylates. Based on the fact that the grid and cathode line patterns are extremely thin being hundreds of angstroms in thickness, the entire structure is transparent.

As indicated, the density of the conductor lines is 200 per inch, but based on the thickness both the grid and cathode line patterns are completely transparent. Further possibilities of modification of the above described apparatus with respect to the design dimensions and fabrications are deemed to be within the capabilities of those skilled in the state of the art.

Hence all such modifications and alterations are deemed to be encompassed within the spirit and scope of the claims appended hereto.

We claim:

1. A method of fabricating an X-Y matrix for an electrophoretic display, comprising the steps of:
    (a) depositing a thin layer of indium-tin-oxide (ITO) on a carrier plate of glass,
    (b) etching said layer to form a vertical line pattern indicative of a Y access grid,
    (c) depositing a first thin layer of photoresist material over said vertical line pattern,
    (d) masking said first thin layer of photoresist according to a horizontal line pattern,
    (e) treating said masked layer to photolithographically form a series of depressions in said first photoresist layer with said depressions forming a horizontal line pattern with each horizontal line defined by a raised photoresist area between depressions,
    (f) plating said photoresist layer with a conductive metal to completely fill said depressions while covering said raised area to form a smooth top metal surface,
    (g) depositing a second layer of photoresist over said smooth top metal surface,
    (h) masking said second layer of photoresist according to said horizontal line pattern,
    (i) treating said masked second layer to photolithographically form a series of depressions in said second photoresist layer with said depressions forming a second horizontal line pattern congruent to said first horizontal line pattern,
    (j) removing all of said photoresist and plating located in said depressions including all of said photoresist in said second layer to obtain said horizontal line pattern over said vertical line pattern with each horizontal line separated from associated vertical lines by a thin layer of photoresist indicative of said raised area between depressions.

2. The method according to claim 1, wherein the step of plating employs the electroless deposition of nickel.

3. The method according to claim 1, wherein the step of depositing said photoresist is depositing a phenolic resin photoresist.

4. The method according to claim 1, including the further steps of:
    securing a conductive plate above said vertical and horizontal line pattern with a space therebetween, and filling said space with an electrophoretic dispersion.

* * * * *